United States Patent
Hoeltzel et al.

(10) Patent No.: US 11,947,100 B2
(45) Date of Patent: Apr. 2, 2024

(54) TELESCOPE HAVING IMPROVED PERFORMANCE

(71) Applicant: SAFRAN ELECTRONICS & DEFENSE, Boulogne Billancourt (FR)

(72) Inventors: Charlotte Hoeltzel, Boulogne Billancourt (FR); Cédric Tacconi, Boulogne Billancourt (FR); Christophe Furui, Boulogne Billancourt (FR); Franck Seillier, Boulogne Billancourt (FR); Guillaume Anna, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 206 days.

(21) Appl. No.: 16/640,694

(22) PCT Filed: Aug. 21, 2018

(86) PCT No.: PCT/EP2018/072583
§ 371 (c)(1),
(2) Date: Feb. 20, 2020

(87) PCT Pub. No.: WO2019/038298
PCT Pub. Date: Feb. 28, 2019

(65) Prior Publication Data
US 2020/0355905 A1  Nov. 12, 2020

(30) Foreign Application Priority Data
Aug. 22, 2017 (FR) ..................... 17 00868

(51) Int. Cl.
*G02B 23/16* (2006.01)
*G02B 7/18* (2021.01)
(Continued)

(52) U.S. Cl.
CPC ............. *G02B 23/16* (2013.01); *G02B 7/181* (2013.01); *G02B 7/182* (2013.01); *G02B 23/02* (2013.01)

(58) Field of Classification Search
CPC ........ G02B 23/16; G02B 7/181; G02B 7/182; G02B 23/02; G02B 7/183; G02B 17/061
(Continued)

(56) References Cited

U.S. PATENT DOCUMENTS 4,268,123 A * 5/1981 Mesco ................... G02B 7/182
359/848
6,304,376 B1 * 10/2001 Baun ................... F16M 11/2014
359/429

(Continued)

FOREIGN PATENT DOCUMENTS

WO    WO 2015/036666 A1    3/2015
WO    WO-2015036665 A1 *  3/2015    ............. G02B 23/16

*Primary Examiner* — Balram T Parbadia
*Assistant Examiner* — Rahman Abdur
(74) *Attorney, Agent, or Firm* — MUNCY, GEISSLER, OLDS & LOWE, P.C.

(57) ABSTRACT

A telescope including a fastener plate, a primary mirror carried by a front face of the plate, and a secondary mirror held facing the primary mirror by a support, wherein the support includes a primary sleeve mounted around the primary mirror, a secondary sleeve mounted around the secondary mirror, and arms connecting the secondary sleeve to the primary sleeve, and in that the arms are curved towards the primary mirror.

21 Claims, 6 Drawing Sheets

(51) Int. Cl.
    *G02B 7/182*       (2021.01)
    *G02B 23/02*       (2006.01)
(58) Field of Classification Search
    USPC .......................................................... 359/857
    See application file for complete search history.

(56) References Cited

U.S. PATENT DOCUMENTS

| | | | |
|---|---|---|---|
| 8,567,969 B2 * | 10/2013 | Thomas | F41G 7/2253 |
| | | | 359/730 |
| 2005/0183377 A1 | 8/2005 | Johnson | |
| 2012/0257275 A1 * | 10/2012 | Hull | G02B 23/16 |
| | | | 359/399 |
| 2013/0208367 A1 | 8/2013 | Thomas et al. | |
| 2017/0090178 A1 | 3/2017 | Bullard et al. | |

* cited by examiner

TELESCOPE HAVING IMPROVED PERFORMANCE

The present invention relates to the field of optics, and more particularly to a telescope suitable for use for observation and for aiming.

STATE OF THE ART

A telescope comprises a structure carrying a primary mirror and a secondary mirror that is held facing the primary mirror by a support in such a manner that the primary mirror reflects light flux to the secondary mirror, which in turn reflects it to an eyepiece. The structure includes a fastener plate for fastening the primary mirror so as to keep the assembly comprising the primary mirror, the support, and the secondary mirror in position relative to the eyepiece, without giving rise to mechanical stresses on the primary mirror.

There are numerous types of telescope in existence, and in particular Newton telescopes and Cassegrain telescopes. In Cassegrain and similar telescopes (Schmidt Cassegrain, Maksutov Cassegrain), the primary mirror is pierced at its center in order to pass the light flux reflected by the secondary mirror to an eyepiece that is arranged behind the primary mirror.

In the telescopes used in observation and aiming systems that are carried by vehicles, the eyepiece is replaced by a sensor connected to a display device mounted in the control station of the vehicle.

The quality of a telescope depends on the relative positioning of the mirrors and on the deformations to which the mirrors are subjected.

Differential expansion and vibration act together to limit the performance of such telescopes.

OBJECT OF THE INVENTION

An object of the invention is to improve the performance of telescopes.

BRIEF SUMMARY OF THE INVENTION

To this end, there is provided a telescope comprising a fastener plate, a primary mirror carried by a front face of the plate, and a secondary mirror held facing the primary mirror by a support.

According to a first characteristic of the invention, the support comprises a primary sleeve mounted around the primary mirror, a secondary sleeve mounted around the secondary mirror, and arms connecting the secondary sleeve to the primary sleeve; and the arms are curved towards the primary mirror.

The arms then enable the secondary mirror to be held in position relative to the primary mirror, while firstly limiting the transmission of vibration to the secondary mirror, and secondly limiting the area of the primary mirror that is masked from incident light by the arms. Also, curving the arms serves to limit the influence, on the secondary mirror, of stresses resulting from expansion of the arms.

Advantageously, as an alternative, or in addition:
each arm has a first end adjacent to the primary sleeve and a second end adjacent to the secondary sleeve, the first end extending radially relative to the primary sleeve and the second end extending tangentially relative to the secondary sleeve; and
each arm is of cross-section that varies between its ends in such a manner that, for a given force generating stresses in the arm, the stresses are distributed in equivalent manner along the arm.

Each of these two arrangements further limits the transmission of vibration and of stresses to the secondary mirror.

According to a second characteristic of the invention, the primary mirror is connected to the plate by fastener elements, each having a base fastened to the plate and, opposite from the base, a bearing that is positioned between first and second rear portions of the primary mirror and that itself receives a third segment of a pin also having first and second segments that are received respectively in first and second holes that are formed respectively in the first and second rear portions. The third segment is received in the bearing as a sliding fit and is adhesively bonded in the bearing by means of a structural adhesive, and the pin is provided with a central channel having a first end opening out into a portion of the pin that is accessible when the pin is in position in the holes in order to receive one end of a cannula for injecting adhesive, and a second end opening out at least into a transverse channel having at least one end opening out into the outside surface of the third segment.

Since the quantity of adhesive is limited, the influence of any expansion of the adhesive under the effect of temperature variation is small, so the adhesive does not generate sufficient stress on the primary mirror to cause the primary mirror to deform.

According to a third characteristic of the invention, the support comprises a primary sleeve mounted around the primary mirror, a secondary sleeve mounted around the secondary mirror, and arms connecting the secondary sleeve to the primary sleeve.

Advantageously, the support includes mechanical decoupling means for decoupling the secondary mirror relative to the primary mirror and, preferably, the secondary sleeve comprises an outer sleeve and an inner sleeve coaxial with the outer sleeve and connected thereto by symmetrically distributed mechanical decoupling elements.

Then advantageously, the secondary mirror is received with clearance in the inner sleeve and is adhesively bonded thereto by means of a structural adhesive; the outer sleeve including third holes and the inner ring including fourth holes, which third and fourth holes are through holes that are substantially in alignment to permit the insertion of a cannula for injecting adhesive.

The presence of mechanical decoupling means, such as the arrangement of the secondary sleeve of the support, serves to limit the transmission of vibration to the secondary mirror, thereby significantly improving the performance of the telescope, in particular when it is carried by a vehicle.

According to a fourth characteristic of the invention, the telescope is of the Cassegrain type and the plate has a rear surface including positioning references for positioning the telescope relative to an image capture device arranged facing the rear face.

Then advantageously, the positioning references are obtained by optical quality machining and comprise a face perpendicular to the optical axis of the telescope in order to form a tilt reference, a central bore in order to form a centering reference, and concave machining in the form of a spherical cap having a center on the optical axis in order to define a distance for the sensor relative to the secondary mirror.

Also advantageously, the secondary mirror includes a central portion facing the primary mirror, which central portion is provided with at least one centering mark for centering the secondary mirror relative to the primary mirror.

This serves to facilitate positioning the image capture device relative to the telescope and positioning the secondary mirror relative to the primary mirror.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

Figure 1:
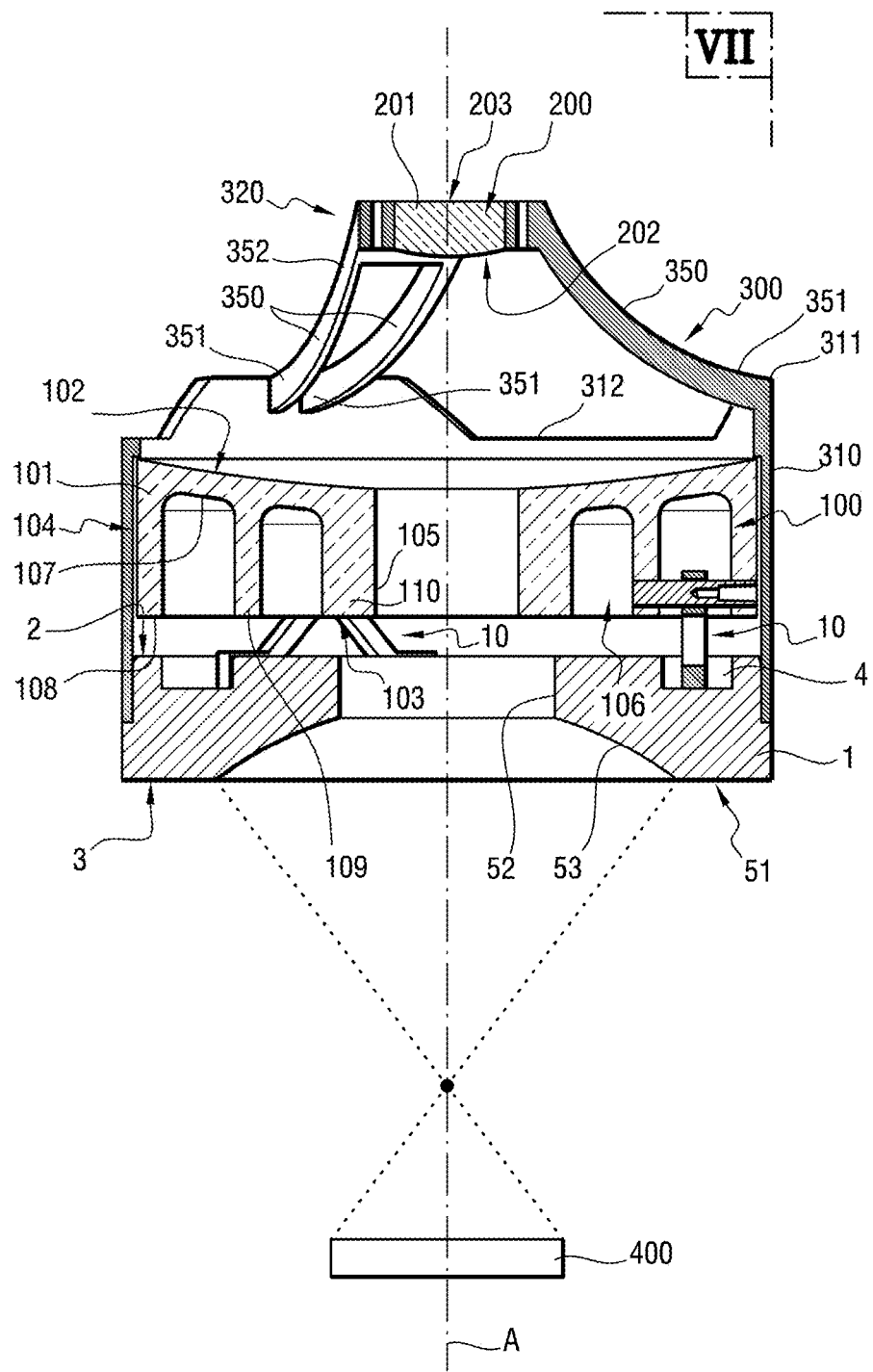
FIG. 1 is a diagrammatic view of a telescope of the invention.
Figure 2:
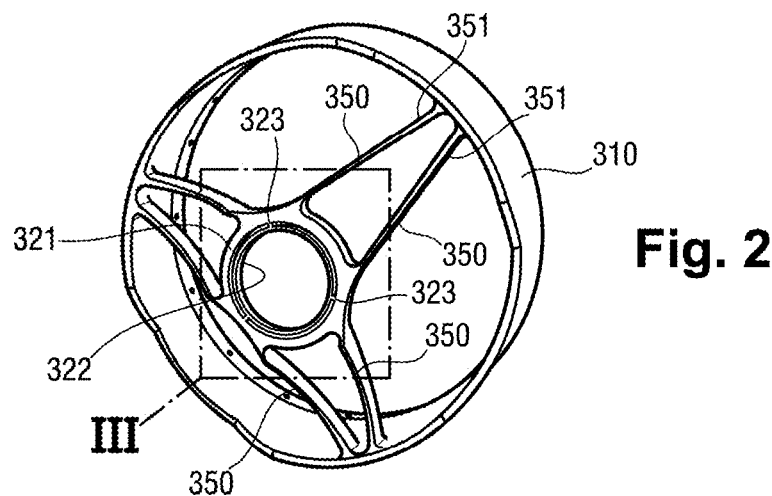
FIG. 2 is a perspective view of the support on its own viewed from a first angle.
Figure 3:
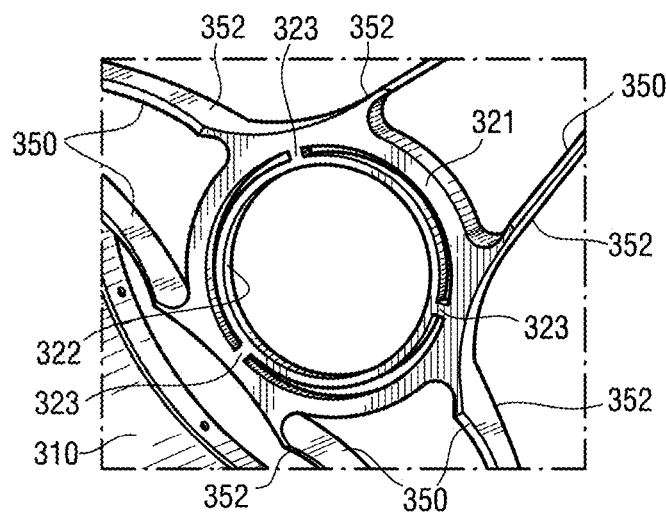
FIG. 3 is a view on a larger scale of a central region of FIG. 2.
Figure 4:
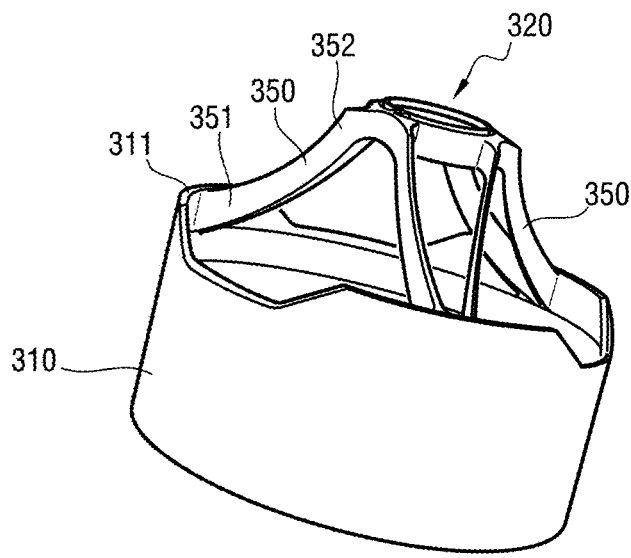
FIG. 4 is a perspective view of the support for the secondary mirror viewed from a second angle.
Figure 5:
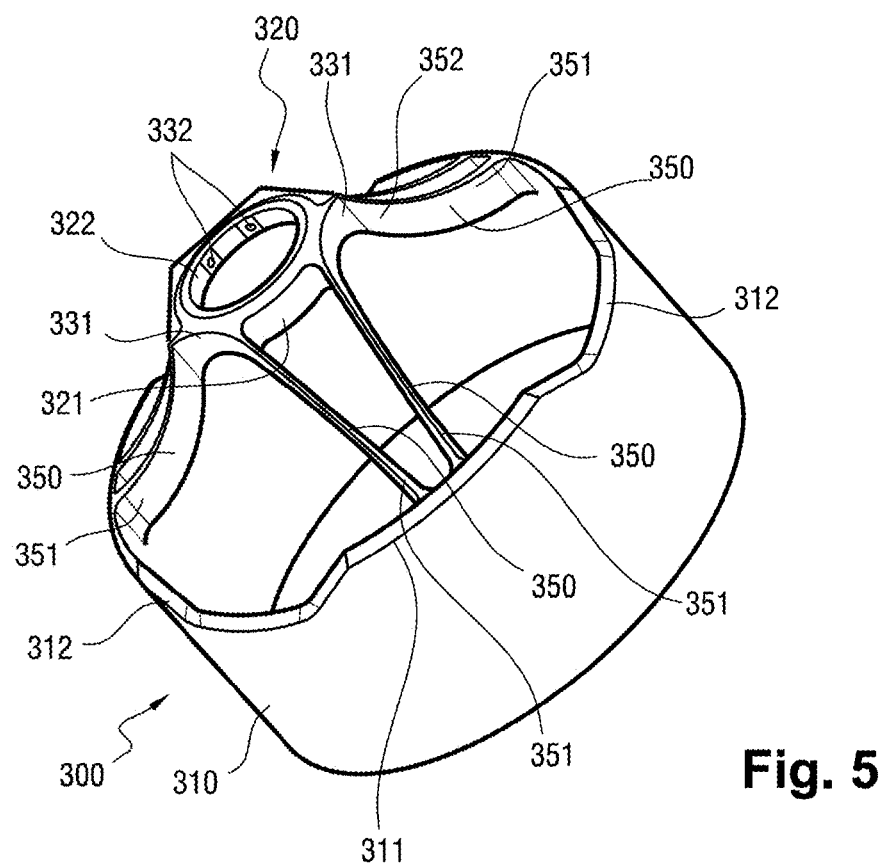
FIG. 5 is a perspective view of the support viewed from a third angle.
Figure 6:
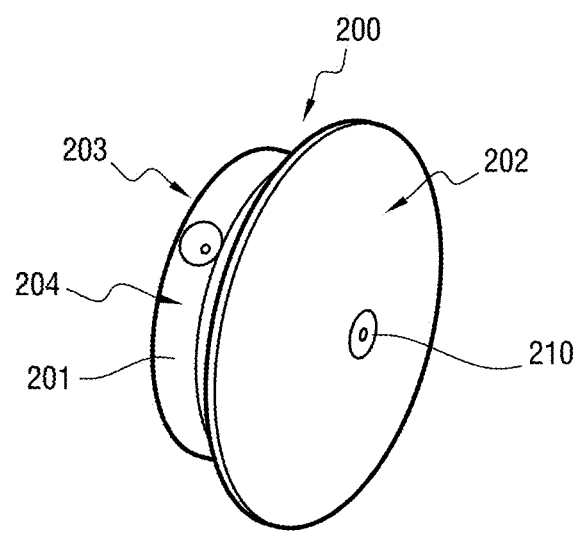
FIG. 6 is a perspective view of the secondary mirror on its own.
Figure 7:
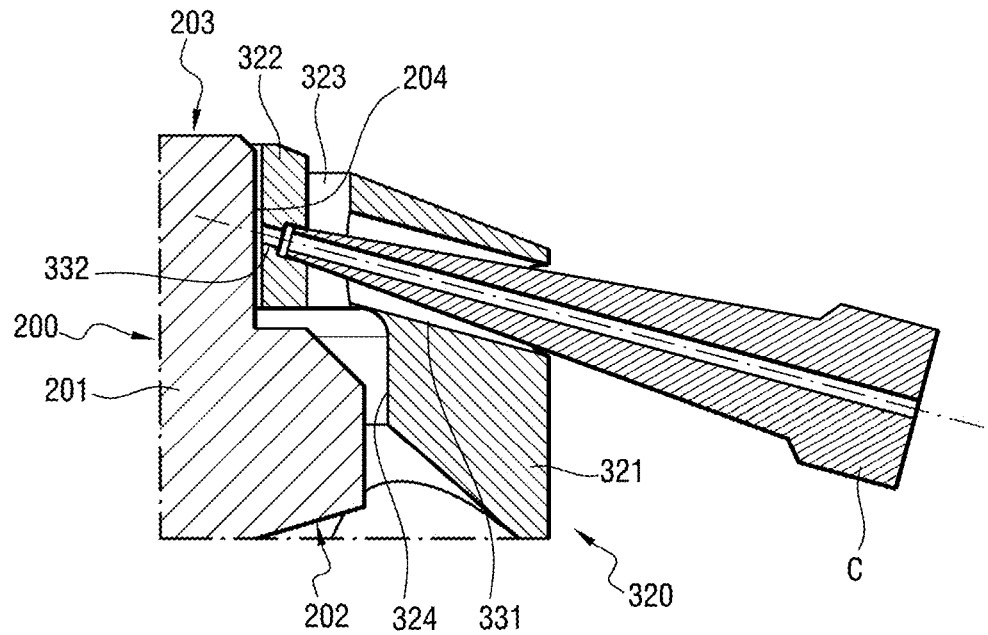
FIG. 7 is a fragmentary view in section on plane VII of FIG. 1.

The invention is described herein in its application to a telescope of the Maksutov Cassegrain type.

With reference to the figures, the telescope of the invention comprises:
a primary mirror;
a secondary mirror; and
a support holding the secondary mirror and the primary mirror facing each other.

In the figures, the primary mirror, the secondary mirror, and the support are given respective general references 100, 200, and 300. the secondary mirror, and the support are given respective general references 100, 200, and 300 in the figures.

The primary mirror 100 comprises an axisymmetric body 101 having a central axis on which there are centered a reflecting surface 102, a reference surface 103 opposite from the reflecting surface 102, a peripheral surface 104 of cylindrical shape, and a central bore 105 opening out in the reflecting surface 102 and in the reference surface 103. The reflecting surface 102 is in the shape of a concave aspherical cap. The reference surface 103 includes a plurality of grooves 106, 107 (two in this example), which grooves are circular in shape, are rectangular in cross-section, are centered on the central axis, and define an outer annular portion 108, an intermediate annular portion 109, and an inner annular portion 110. The groove 106 is closer to the central axis than the groove 107. The grooves 106, 107 serve to lighten the primary mirror 100, while the portions 108, 109, and 110 form ribs for stiffening the reflecting surface 102.

The secondary mirror 200 comprises an axisymmetric body 201 having a central axis on which there are centered a reflecting surface 202, a face 203 opposite from the reflecting surface 202, and a peripheral surface 204 of cylindrical shape. The reflecting surface 202 is in the shape of a convex aspherical cap that faces the reflecting surface 102 of the primary mirror 100. The central axis of the secondary mirror 200 is aligned on the central axis of the primary mirror 100 in order to define the optical axis A of the telescope.

In this example, the primary mirror 100, the secondary mirror 200, and the support 300 are all made of aluminum.

The primary mirror 100 is mounted on a fastener plate, given overall reference 1, and having the support 300 fastened thereon.

The support 300 comprises a primary sleeve 310 mounted on the fastener plate 1 in order to extend around the primary mirror 100, a secondary sleeve 320 mounted around the secondary mirror 200, and arms 350 connecting the secondary sleeve 320 to the primary sleeve 310. In this example, the support 300 is a single piece.

The primary sleeve 310 extends around the primary mirror 1 without touching it, and it includes a margin 313 surrounding the fastener plate 1 in order to fasten the sleeve to the fastener plate 1. In this example, the primary sleeve 310 is fastened to the fastener plate 1 by adhesive using a structural adhesive, specifically an epoxy adhesive. At its opposite end, the primary sleeve 310 has a margin 311 projecting from the primary mirror 100 towards the secondary mirror 200, and the margin 311 is provided with notches 312 for minimizing the portion of the primary sleeve 310 that projects from the primary mirror 100 and that runs the risk of intercepting a secondary light flux going towards the primary mirror 100.

Each arm 350 has a first end 351 connecting it substantially radially to the primary sleeve 310 and a second end 352 connecting it substantially tangentially to the secondary sleeve 320. The arms 350 are arranged as three pairs positioned at 120° from one another. The first ends 351 are secured to the inside surface 313 of the portions of the primary sleeve 310 that project from the reflecting surface 102 between the notches. The arms 350 in each pair diverge from each other so that the second end 352 of each of the arms 350 in a pair almost meets the second end 352 of the adjacent arm 350 belonging to another pair of arms 350.

The arms 350 are curved towards the primary mirror 100. More precisely, the arms 350 are curved towards the primary mirror in the sense that each armour has a convex portion beside the primary mirror (in other words, each arm presents an arch directed towards the primary mirror). Each arm 350 is of cross-section that varies between its ends 351 and 352 in such a manner that, for a given force generating stresses in the branch, the stresses are distributed in equivalent manner along the arm 350. In this example, the cross-section is rectangular in shape, with a major axis parallel to the optical axis A.

The arms 350 are thus arranged so as to:
have stiffness and resistance to stresses that are sufficient to limit the transmission of vibratory energy to the secondary mirror 200; and
have an area as projected onto the primary mirror 100 that is small in order to limit the amount of shadow that is projected by the arms 350 onto the primary mirror 100.

The support 300 includes mechanical decoupling means for decoupling the secondary mirror 200 relative to the primary mirror 100.

The secondary sleeve 320 has an outer sleeve 21 to which the second ends 352 of the arm 350 are connected, and an inner sleeve 322 coaxial with the outer sleeve 321 and connected thereto by symmetrically distributed mechanical decoupling elements. In this example, the mechanical decoupling elements are in the form of three spring blades 323 extending radially between the outer sleeve 321 and the inner sleeve 322. The spring blades 323 are arranged at 120° so that each spring blade 323 is positioned symmetrically between two pairs of arms 350. Each spring blade 323 is arranged to be relatively rigid in a direction parallel to the optical axis A, but relatively flexible in a circumferential direction of the secondary sleeve 200.

Figure 8:
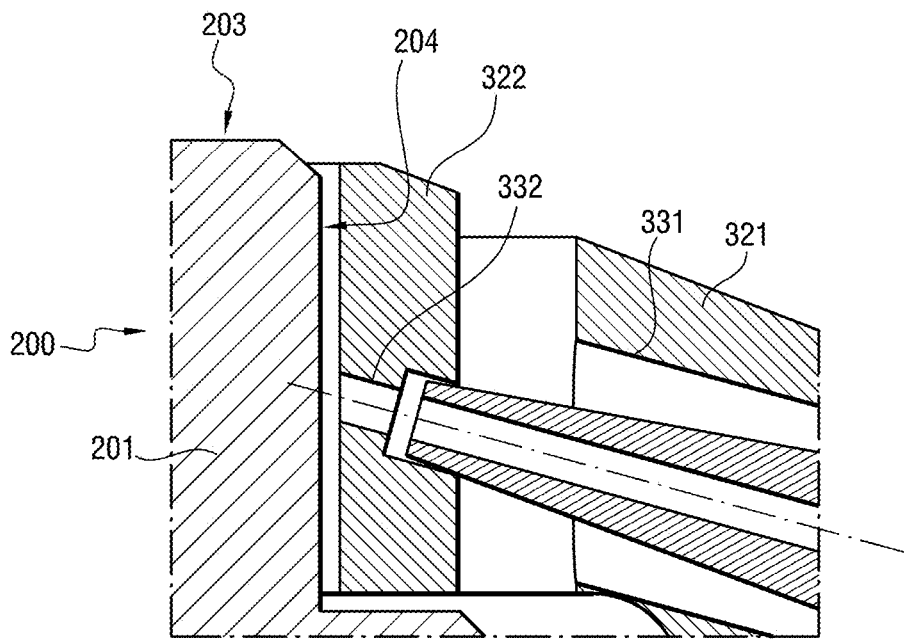
FIG. 8 is a detail view of FIG. 7.
Figure 9:
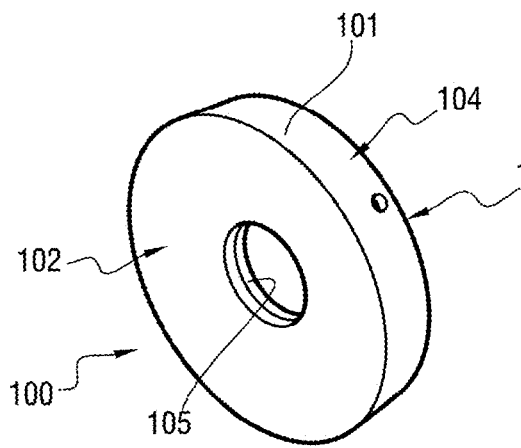
FIG. 9 is a perspective view of the primary mirror on its own.
Figure 10:
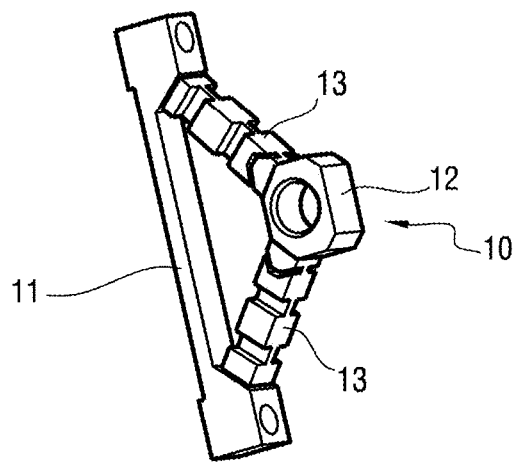
FIG. 10 is a view of a fastener element for fastening the primary mirror on the plate.
Figure 11:
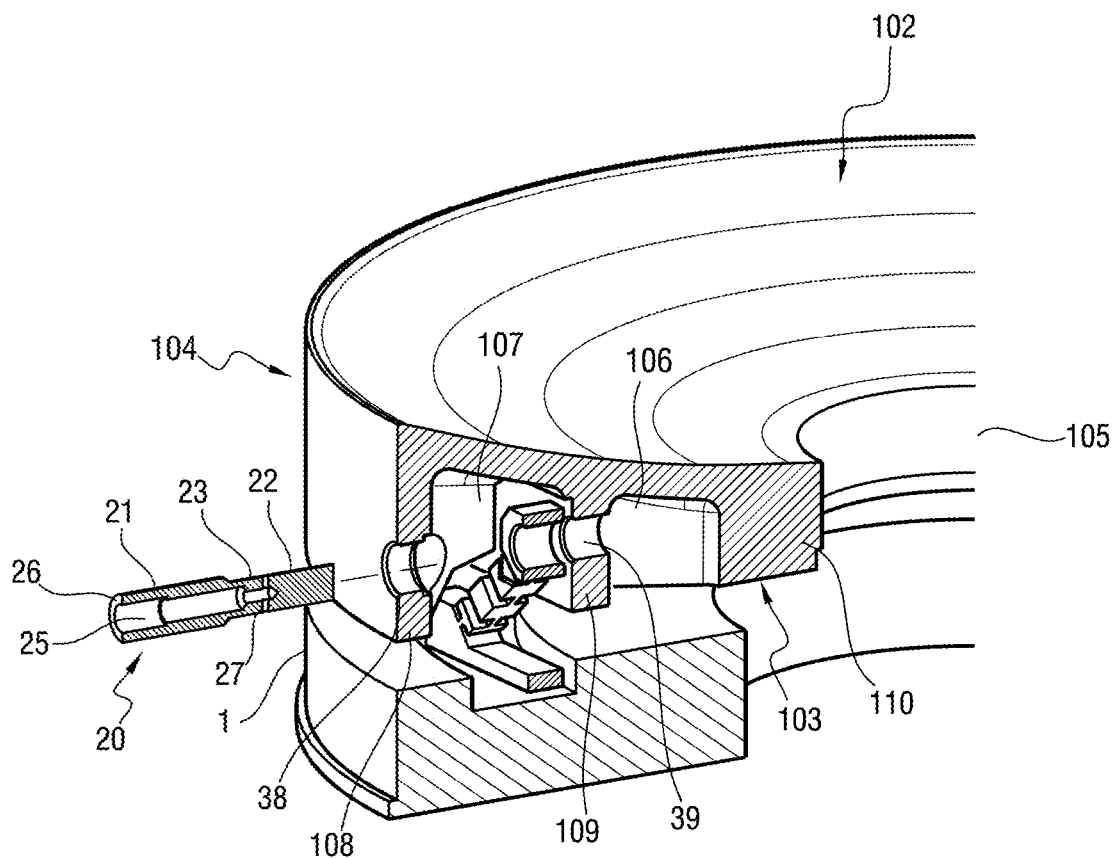
FIGS. 11 to 13 are fragmentary views in perspective and in section showing the primary mirror being mounted on the plate.
Figure 12:
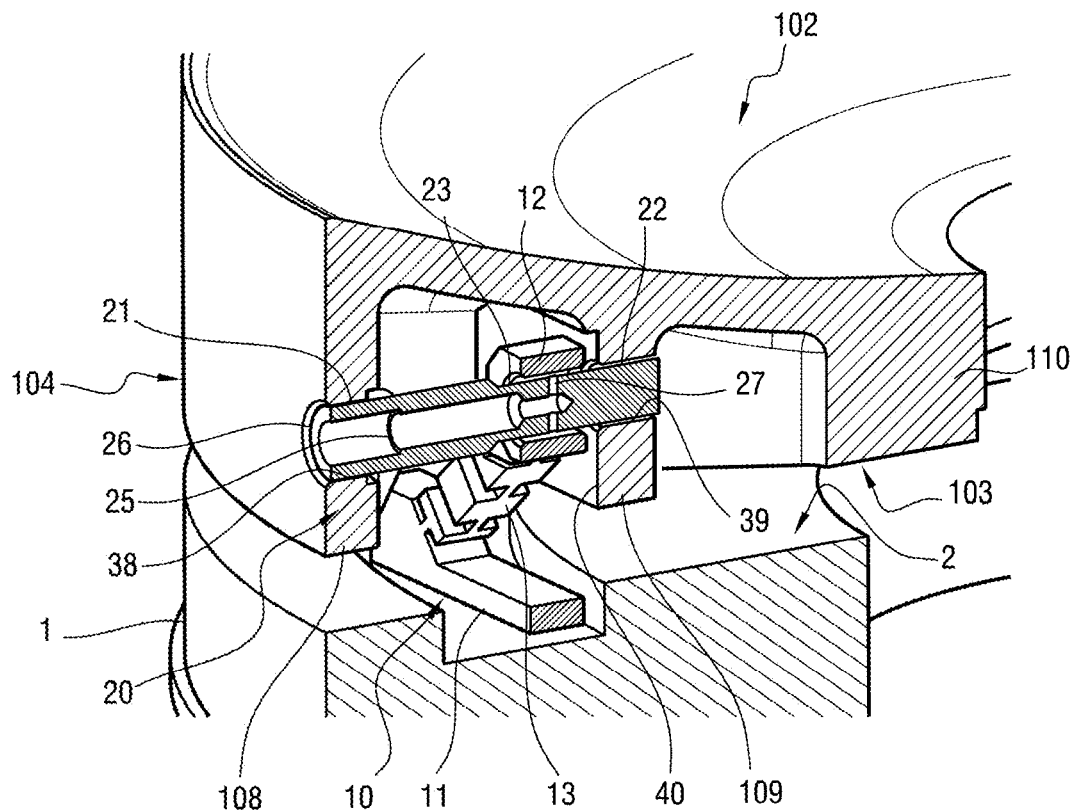
Figure 13:
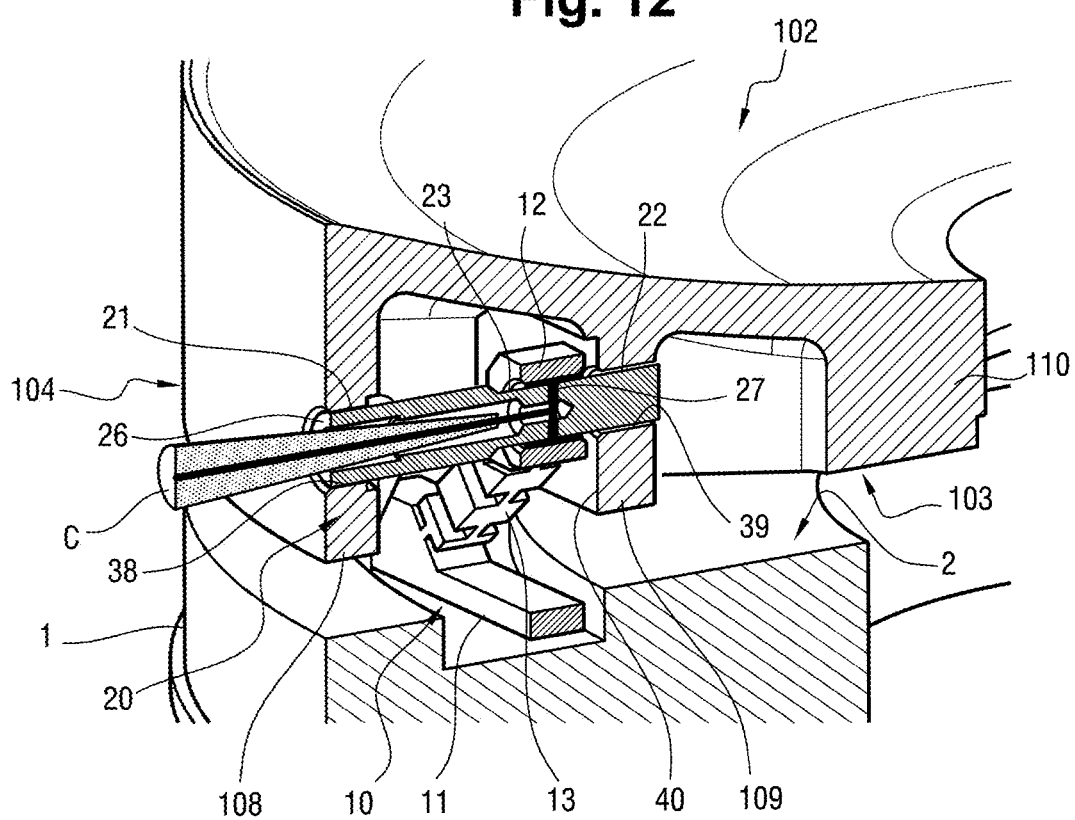

The outer sleeve 321 has third holes 331, and the inner sleeve 322 has fourth holes 332, which third and fourth holes are through holes that are substantially in alignment. Each hole 331 and the hole 332 that is in alignment therewith form a pair of holes that permit a cannula C for injecting adhesive to be inserted from the outside of the outer sleeve 321. The hole 331 is arranged to guide the cannula towards the hole 332. Each hole 332 is stepped in order to form an abutment against pushing the cannula into the hole 332, and it is arranged to provide a leaktight connection with the cannula C. For this purpose, the cannula C is conical in shape, and each hole 332 has an inlet segment of diameter that is slightly smaller than the outside diameter of the cannula C at a point set back a little (1 millimeter (mm) or 2 mm) from its end, in such a manner as to press against it (see in particular FIG. 8).

The support 300 has six pairs of holes 331, 332 in such a manner that:
  each hole 331 has one end opening out to the outside of the outer sleeve 321 between the second ends 352 of a pair of arms 350, and one end opening out to the inside of the outer sleeve 322 between the two spring blades 323;
  each hole 332 has one end opening out to the inside of the outer sleeve 321 between two spring blades 323 and facing the end of the corresponding hole 331, and one end opening out to the inside of the inner sleeve 322; and
  the openings of the holes 332 are distributed symmetrically inside the inner sleeve 322.

The secondary mirror 200 is received in the inner sleeve 322 with radial clearance of about 0.25 mm and is adhesively bonded therein by means of a structural adhesive. The positioning of the pairs of holes 331, 332 enables the adhesive to be spread uniformly around the secondary mirror 200. The small clearance between the inside surface of the inner sleeve 322 and the peripheral surface 204 of the secondary mirror 200 serves firstly to enable the position (in terms of tilt and centering) of the secondary mirror 200 to be adjusted relative to the axis of the primary mirror 100, and secondly to limit the thickness of adhesive that extends between these two surfaces. Having a thickness that is relatively small serves to limit the stresses that the adhesive can exert on the secondary mirror 200 as a result of a variation in temperature. In this example, the adhesive used is an epoxy adhesive, and by way of example it is the adhesive sold under the trademark 3M with the reference DP490. It should be observed that the outer sleeve 321 has an inside surface provided with an annular recess 324 to avoid interfering with the secondary mirror 200 during operations of adjusting the position of said secondary mirror 200.

The plate 1 is of the axisymmetric shape about a central axis that coincides with the optical axis of the telescope, and it has a front face 2 facing the fastener face 103 of the primary mirror 100, and opposite therefrom, a rear surface given overall reference 3 in FIG. 1.

The front face 2 is provided with a groove 4 of circular shape centered on the central axis of the fastener plate 1. The groove 4 has a flat bottom with fastener elements 10 fastened thereto, each fastener element 10 having a base 11 resting flat against the bottom of the groove 4, and opposite from its base 11, a bearing 12 that projects beyond the front face 2. The bearing 12 is connected to the base 11 by two connecting rods 13 arranged to form a triangle together with the base 11. The connecting rods 13 are made integrally with the bearing 12 and with the base 11.

There are three fastener elements 10 that are arranged at 120° from one another symmetrically about the central axis.

The bearing 12 of each fastener element 10 is positioned in the groove 107 between the outer annular portion 108 and the intermediate annular portion 109.

Each bearing 12 receives a third segment 23 of a pin, given overall reference 20 in the figures, which pin has a first segment 21 and a second segment 22 that are received respectively in a first hole 38 and in a second hole 39, which holes are arranged in the outer annular portion 108 and in the intermediate annular portion 109. The holes 38 and 39 are through holes.

The second segment 22 is of diameter that is smaller than the third segment 23 and it is connected thereto via a shoulder that forms an abutment against pushing the second segment 22 into the second hole 39. The first segment 21 has a diameter greater than the third segment 23.

The first segment 21 and the second segment 22 are adhesively bonded respectively in the first hole 38 and in the second hole 39 by means of an anaerobic structural adhesive. More particularly, the adhesive used is sold under the trademark LOCTITE with the reference 638. It is advantageous to leave as little space as possible between the outside surfaces of the segments 21 and 22 and the inside surfaces of the holes 38 and 39. The smallest possible space must be sufficient to allow the two surfaces to slide relative to each other prior to being bonded together, and to admit a quantity of adhesive that is just sufficient to bond the two surfaces together, given the forces that are to be withstood. The fluidity of the adhesive has an influence on the dimensions given to this space, since the greater the fluidity of the adhesive, the smaller the thickness needed by this space. It should be understood that it is desired to minimize this thickness and thus to minimize the quantity of adhesive so that, in the event of a temperature variation, the adhesive does not generate stresses on the primary mirror 100 that might deform it.

The pin 20 is provided with a central channel 25 having:
  a first end opening out into a terminal face 26 of the pin 20 that forms a portion of the pin 20 that is accessible when the pin 20 is in position in the holes 38 and 39 in order to receive an end of a cannula C for injecting adhesive; and
  a second end opening out at least into a transverse channel 27 having its two ends opening out at diametrically opposite points in an outside surface of the third segment 23.

The third segment 23 is received in the bearing 12 as a sliding fit. In this example, the sliding fit is of the H7g6 type, but it could be of the H7g5 type or any other sliding fit that leaves as little space as possible between the outside surface of the third segment 23 and the inside surface of the bearing 12. The third segment 23 is adhesively bonded in the bearing 12 by means of a structural adhesive injected into the central channel 25 and then into the transverse channel 27 by means of the cannula C inserted into an inlet segment of the central channel 25 that opens out in the terminal face 26. More particularly, the adhesive used is an epoxy structural adhesive, e.g. the adhesive sold under the trademark 3M with the reference DP490. The smallest possible space left between the outside surface of the third segment 23 and the inside surface of the bearing 12 must be sufficient to enable the two surfaces to slide relative to each other prior to adhesive bonding, and to admit a quantity of adhesive that is just sufficient to fasten the two surfaces together, given the forces that are to be withstood. The fluidity of the adhesive has an influence on this space, since the greater the fluidity of the adhesive, the smaller the thickness needed by this space. It should be understood that it is desired to minimize this thickness and thus to minimize the quantity of adhesive so that, in the event of a temperature variation, the adhesive does not generate stresses on the primary mirror 100 that might deform it.

Beside the annular groove 107, each of the holes 39 opens out into a recess 40 formed in the intermediate annular portion 109 so as to avoid any contact between the bearing 12 and a surface of the intermediate annular portion 109.

It should be observed that the connecting rods 13 are arranged to provide mechanical decoupling between the primary mirror 100 and the fastener plate 1 so as to support the primary mirror 100 while limiting the creation of any mechanical stresses in the primary mirror 100. For this purpose, the connecting rods 13 include portions of small thickness in a direction perpendicular to the optical axis and to their own longitudinal axes so that the connecting rods are more rigid relative to forces that are parallel to the optical axis A than to forces that are perpendicular to the optical axis A and to their own longitudinal axes.

The mirrors 100 and 200, the support 300, and the plate 1 are assembled together as follows.

The base 11 of each fastener element 10 is initially fastened to the plate 1 by screw fastener elements that are not visible in the figures. Thereafter the mirror 100 is fastened to the fastener elements 10. To do this, the bearings 12 are engaged in the groove 107 and each pin 20 is engaged successively into the corresponding hole 38, bearing 12, and hole 39, after the anaerobic structural adhesive has been deposited on the first segment 21 and on the second segment 22. Thereafter, the epoxy structural adhesive is introduced between the inside surface of the bearing 12 and the outside surface of the third segment 23 via the central channel 25 and then the transverse channel 27.

Thereafter, the support 300 is adhesively bonded to the plate 1 and then the secondary mirror 200 is adhesively bonded to the support 300 as described above.

The rear surface 3 of the fastener plate 1 includes positioning references for positioning the telescope relative to an image capture assembly shown symbolically in FIG. 1 under reference 400 and arranged facing the rear face 3. The image capture assembly 400 comprises a sensor and optionally one or more lenses mounted in front of the sensor.

The positioning references are obtained by optical quality machining, and they comprise:
an annular face 51 centered on the optical axis of the telescope and perpendicular to the optical axis of the telescope so as to form a tilt reference;
a central bore 52 for forming a centering reference; and
a concave surface portion 53 in the form of a spherical cap having its center on the optical axis so as to define a distance for the sensor relative to the secondary mirror 200.

The sensor is positioned parallel to the rear faces 3 and in such a manner that the focal point defined by the concave surface portion 53 coincides with the focal point of the sensor.

Also, the reflecting surface of the secondary mirror 200 has a central portion provided with at least one mark 210 for centering the secondary mirror 200 relative to the primary mirror 100. The mark 210 is in the form of a ring centered on the optical axis of the secondary mirror.

Before applying the adhesive, the positioning of the secondary mirror 200 relative to the primary mirror 100 is adjusted by optical interferometry between the surfaces 202 and 102, and by moving the secondary mirror 200 by means of micro-actuators.

Naturally, the invention is not limited to the embodiments described and covers any variant coming within the ambit of the invention as defined by the claims.

In particular, although in this example all of the components of the telescope are made of aluminum in order to limit differential expansion, it is possible to make the telescope using other materials, providing they have uniform coefficients of expansion so as to limit stresses on the components that might give rise to any relative movement between the mirrors or to any deformation thereof . . . .

In a variant, the pin may be cantilevered out from a single rear portion of the primary mirror.

Although the telescope of the invention provides very high performance when all four characteristics of the invention are combined, as in the embodiment described, the four characteristics are independent of one another and it is possible to implement the invention using the first characteristic on its own or in combination with one or two of the other remaining characteristics.

Although in this example the means for mechanically decoupling the secondary mirror 200 relative to the primary mirror 100 are provided by the arrangement of the secondary sleeve 320 as two sleeves 321 and 322 that are connected together by spring blades 323, it is possible to envisage other embodiments of these mechanical decoupling means. In particular, mechanical decoupling means, such as spring blades, could be interposed between the primary sleeve 310 and each of the first ends 351 of the arms 350.

The secondary mirror could be fastened to the secondary sleeve in a manner different from that described.

The arms could be of shapes other than that described, and they could present only one of the following characteristics:
each arm has a first end adjacent to the primary sleeve and a second end adjacent to the secondary sleeve, the first end extending radially relative to the primary sleeve and the second end extending tangentially relative to the secondary sleeve;
each arm is of cross-section that varies between its ends in such a manner that, for a given force generating stresses in the arm, the stresses are distributed in equivalent manner along the arm.

The fastening of the primary mirror on the plate may be performed differently. The fastener elements 10 may be of shapes other than that described, and the pins 20 may be smooth or they may be cantilever mounted. The number of fastener elements 10 could be other than three. Each fastener element could be made up of a plurality of parts.

The primary sleeve could be fastened to the plate in different manner, e.g. adhesively.

The transverse channel 27 could have only one end opening out in the outside surface of the third segment 23, and there could be a plurality of transverse channels 27, e.g. three channels at 120° from one another.

The rear face of the plate need not include the positioning references, or it could include only some of them.

The invention is applicable to other types of telescope, and for example to a telescope of the Schmidt Cassegrain type.

The invention claimed is:

1. A telescope comprising a fastener plate, a primary mirror carried by a front face of the plate, and a secondary mirror held facing the primary mirror by a support, wherein the support comprises a primary sleeve extending around the primary mirror so that the primary mirror fully extends within the primary sleeve without the primary sleeve touching the primary mirror, a secondary sleeve mounted around the secondary mirror, and arms connecting the secondary sleeve to the primary sleeve, the arms being curved towards the primary mirror in such a manner that each arm has a convex portion side facing the primary mirror and each arm being of cross-section that varies between its ends in such a manner that, for a given force generating stresses in the arm, the stresses are distributed in equivalent manner along the arm.

2. The telescope according to claim 1, wherein the primary mirror is connected to the plate by fastener elements, each having a base fastened to the plate and, opposite from the base, a bearing that is positioned between first and second rear portions of the primary mirror and that itself receives a third segment of a pin also having first and second segments that are received respectively in first and second holes that are formed respectively in the first and second rear portions; in that the third segment is received in the bearing as a sliding fit and is adhesively bonded in the bearing by means of a structural adhesive; and in that the pin is provided with a central channel having a first end opening out into a portion of the pin that is accessible when the pin is in position in the holes in order to receive one end of a cannula for injecting adhesive, and a second end opening out at least into a transverse channel having at least one end opening out into the outside surface of the third segment.

3. The telescope according to claim 2, wherein the second segment is of diameter that is smaller than the third segment and it is connected thereto via a shoulder that forms an abutment against pushing the second segment into the second hole.

4. The telescope according to claim 3, wherein the second hole is a through hole.

5. The telescope according to claim 3, wherein the first segment has a diameter greater than the third segment.

6. The telescope according to claim 2, wherein the second portion includes a recess facing the bearing in order to avoid any contact between the bearing and the second portion.

7. The telescope according to claim 2, wherein the fit is a sliding fit.

8. The telescope according to claim 2, wherein the first and second portions are separated from each other by a segment of a circular groove centered on the optical axis of the telescope.

9. The telescope according to claim 2, wherein the bearing is connected to the base by two connecting rods arranged to form a triangle together with the base.

10. The telescope according to claim 9, wherein the connecting rods are made integrally with the bearing and with the base, and the connecting rods are arranged to provide mechanical decoupling between the primary mirror and the plate in such a manner as to support the primary mirror, while limiting the creation of any mechanical stresses in the primary mirror.

11. The telescope according to claim 1, wherein the primary sleeve has a margin projecting from the primary mirror towards the secondary mirror, and the margin is provided with notches.

12. The telescope according to claim 1, wherein the support includes mechanical decoupling means for decoupling the secondary mirror relative to the primary mirror.

13. The telescope according to claim 12, wherein the secondary sleeve comprises an outer sleeve and an inner sleeve coaxial with the outer sleeve and connected thereto by symmetrically distributed mechanical decoupling elements.

14. The telescope according to claim 13, wherein the secondary mirror is received with clearance in the inner sleeve and is adhesively bonded thereto by means of a structural adhesive; the outer sleeve including third holes and the inner ring including fourth holes, which third and fourth holes are through holes that are substantially in alignment to permit the insertion of a cannula for injecting adhesive.

15. The telescope according to claim 14, wherein the fourth hole is stepped so as to form an abutment against pushing the cannula into the fourth hole, and the fourth hole is arranged to provide a leaktight connection with the cannula.

16. The telescope according to claim 1, wherein each arm has a first end adjacent to the primary sleeve and a second end adjacent to the secondary sleeve, the first end extending substantially radially relative to the primary sleeve and the second end connecting substantially tangentially to the secondary sleeve.

17. The telescope according to claim 1, wherein: each arm has a first end adjacent to the primary sleeve and a second end adjacent to the secondary sleeve, the first end extending radially relative to the primary sleeve and the second end extending tangentially relative to the secondary sleeve; the arms are curved towards the primary mirror; and each arm is of cross-section that varies between its ends in such a manner that, for a given force generating stresses in the arm, the stresses are distributed in equivalent manner along the arm.

18. The telescope according to claim 1 wherein the telescope is of the Cassegrain type and the plate has a rear surface including positioning references for positioning the telescope relative to an image capture device arranged facing the rear face.

19. The telescope according to claim 18, wherein the positioning references are obtained by optical quality machining and comprise a face perpendicular to the optical axis of the telescope in order to form a tilt reference, a central bore in order to form a centering reference, and a concave surface in the form of a spherical cap having a center on the optical axis in order to define a distance for the image capture device relative to the secondary mirror.

20. The telescope according to claim 18, wherein the secondary mirror includes a central portion facing the primary mirror, which central portion is provided with at least one centering mark for centering the secondary mirror relative to the primary mirror.

21. The telescope according to claim 20, wherein the mark is in the form of a ring centered on the optical axis of the secondary mirror.

\* \* \* \* \*